(12) United States Patent

Hammersberg et al.

(10) Patent No.: US 12,566,935 B2

(45) Date of Patent: Mar. 3, 2026

(54) ENROLLMENT ASSISTANCE DEVICE WITH CAPACITIVE COUPLING PADS, BIOMETRIC SYSTEM AND ENROLLMENT METHOD

(71) Applicant: FINGERPRINT CARDS ANACATUM IP AB, Gothenburg (SE)

(72) Inventors: Johan Hammersberg, Floda (SE); Muhammad Asad, Lubbeek (BE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 18/874,600

(22) PCT Filed: Jun. 19, 2023

(86) PCT No.: PCT/SE2023/050618

§ 371 (c)(1),
(2) Date: Dec. 13, 2024

(87) PCT Pub. No.: WO2023/249540

PCT Pub. Date: Dec. 28, 2023

(65) Prior Publication Data

US 2025/0342335 A1 Nov. 6, 2025

(30) Foreign Application Priority Data

Jun. 23, 2022 (SE) .................................... 2250780-0

(51) Int. Cl.
G06K 19/06 (2006.01)
G06K 19/073 (2006.01)
H02J 50/05 (2016.01)
H02J 50/10 (2016.01)

(52) U.S. Cl.
CPC ........ G06K 19/07354 (2013.01); H02J 50/05 (2016.02); H02J 50/10 (2016.02)

(58) Field of Classification Search
CPC ..... G06K 19/07354; H02J 50/05; H02J 50/10
See application file for complete search history.

(56) References Cited

U.S. PATENT DOCUMENTS

| | | | |
|---|---|---|---|
| 8,102,021 | B2 | 1/2012 | Degani |
| 2015/0214993 | A1 | 7/2015 | Huang |
| 2016/0322867 | A1 | 11/2016 | Polu et al. |
| 2017/0366351 | A1 | 12/2017 | Khullar et al. |
| 2018/0219423 | A1 | 8/2018 | Maunder et al. |
| 2018/0294845 | A1 | 10/2018 | Bimbaud et al. |
| 2020/0013032 | A1 | 1/2020 | Moskowitz et al. |
| 2020/0311509 | A1 | 10/2020 | Benkley, III et al. |
| 2020/0327533 | A1 | 10/2020 | Deprun et al. |
| 2020/0349408 | A1 | 11/2020 | Prawitz et al. |
| 2021/0374218 | A1 | 12/2021 | Humborstad et al. |

OTHER PUBLICATIONS

International Search Report and Written Opinion for corresponding International Application No. PCT/SE2023/050618, filed Jun. 19, 2023, dated Aug. 11, 2023, 14 pages.

*Primary Examiner* — Jamara A Franklin

(74) *Attorney, Agent, or Firm* — Westman, Champlin & Koehler, P.A.

(57) ABSTRACT

An enrollment assistance device with a first surface portion for a user device, and a second surface portion for a contactless smartcard; a first conductor spiral arranged in the first surface portion; a second conductor spiral conductively separated from the first conductor spiral and arranged in the second surface portion. The first conductor spiral and the second conductor spiral are coupled to each other by capacitive coupling pads.

13 Claims, 5 Drawing Sheets

ENROLLMENT ASSISTANCE DEVICE WITH CAPACITIVE COUPLING PADS, BIOMETRIC SYSTEM AND ENROLLMENT METHOD

CROSS-REFERENCE TO RELATED APPLICATION

This Application is a Section 371 National Stage Application of International Application No. PCT/SE2023/050618, filed Jun. 19, 2023 and published as WO 2023/249540 A1 on Dec. 28, 2023, in English, which claims priority to Swedish Application No. 2250780-0, filed Jun. 23, 2022, the contents of which are hereby incorporated by reference in their entirety.

FIELD OF THE INVENTION

The present invention relates to an enrollment assistance device, for facilitating biometric enrollment of a user of a contactless smartcard including a biometric arrangement, and to a method of enrolling the user.

BACKGROUND OF THE INVENTION

Biometric arrangements are widely used as means for increasing the convenience and security of personal electronic devices, such as mobile phones etc. Fingerprint sensing arrangements, in particular, are now included in a large proportion of all newly released personal communication devices, such as mobile phones.

Lately, efforts have also been made to introduce biometric arrangements, such as fingerprint sensing arrangements, in other devices that may have less computing power and/or available energy. Examples of such other devices are so-called smartcards, door locks, and devices in the so-called internet of things (IoT) category etc.

It is, however, challenging to provide for secure, reliable, and convenient biometric enrollment of a user of such biometric arrangements. For instance, it may be desirable to guide the user during the enrollment, which is complicated by the fact that some devices with biometric arrangements may lack a user interface, or may have only rudimentary means for interacting with the user. For example, a biometrically enabled smartcard may typically have no user interface integrated in the smartcard.

For a contactless smartcard, US 2020/0327533 proposes to power and communicate with the smartcard during enrollment using the user's mobile device. To aid the user in correctly positioning the smartcard in relation to the mobile device, US 2020/0327533 discloses that a visual marker is displayed on the screen of the mobile device to guide the user to correctly arrange the smartcard on the backside of the mobile device during the enrollment procedure.

It appears to be potentially cumbersome for the user to press the smartcard against the backside of the mobile device, while attempting to enroll one or more fingers, and at the same time follow instructions and guidance provided on the display on the frontside of the mobile device.

It would therefore be desirable to provide for more user-friendly enrollment in a biometrically enabled contactless smartcard.

SUMMARY

In view of above-mentioned and other drawbacks of the prior art, it is an object of the present invention to provide for improved, in particular more user-friendly, enrollment in a biometrically enabled contactless smartcard.

According to a first aspect of the present invention, it is therefore provided an enrollment assistance device, for facilitating biometric enrollment of a user of a contactless smartcard including a biometric arrangement and a wireless power transfer arrangement, the enrollment assistance device comprising: a first conductor spiral in a first conductor layer of the enrollment assistance device, and arranged to form a first wireless power transfer link with the wireless power transfer arrangement of a user device when the user device is arranged on a first surface portion of the enrollment assistance device, the first conductor spiral having a first conductor end inside the first conductor spiral and a second conductor end outside the first conductor spiral, wherein the first conductor end is conductively connected to a first capacitive coupling pad of the first conductor spiral and the second conductor end is conductively connected to a second capacitive coupling pad of the first conductor spiral; and a second conductor spiral in a second conductor layer of the enrollment assistance device conductively separated from the first conductor layer by an insulating layer, and arranged to form a second wireless power transfer link with the wireless power transfer arrangement of the contactless smartcard when the contactless smartcard is arranged on a second surface portion of the enrollment assistance device, the second conductor spiral having a first conductor end inside the second conductor spiral and a second conductor end outside the second conductor spiral, wherein the first conductor end is conductively connected to a first capacitive coupling pad of the second conductor spiral and the second conductor end is conductively connected to a second capacitive coupling pad of the second conductor spiral, wherein the first capacitive coupling pad of the first conductor spiral overlaps with the second capacitive coupling pad of the second conductor spiral, and the second capacitive coupling pad of the first conductor spiral overlaps with the first capacitive coupling pad of the second conductor spiral.

The present invention is based upon the realization that enrollment in a biometrically enabled contactless smartcard can be improved by utilizing wireless power transfer from a user device and facilitating arrangement of the contactless smartcard in relation to the user device, so that the user is not required to actively hold the smartcard in relation to the user device during the enrollment procedure.

The present inventors have further realized that this can be achieved by providing an enrollment assistance device comprising a first conductor spiral arranged to form a first wireless power transfer link with a wireless power transfer arrangement of the user device when the user device is arranged on a first surface portion of the enrollment assistance device, a second conductor spiral arranged to form a second wireless power transfer link with a wireless power transfer arrangement of the contactless smartcard when the contactless smartcard is arranged on a second surface portion of the enrollment assistance device, and capacitive coupling pads arranged to capacitively connect the first and second conductor spirals such that power can be transferred from the user device to the contactless smartcard via the first and second conductor spirals and the capacitive coupling pads.

Hereby, the contactless smartcard and the user device can, for example, be arranged so that the user has easy access to a biometric sensor, such as a fingerprint sensor, on the smartcard during the entire enrollment procedure. In the event that the user device has a GUI (graphical user interface), the user can also be guided during the enrollment, using the GUI of the user device. This may provide for a shorter and more convenient enrollment procedure, and may also result in a higher quality of the enrolled biometric template.

Furthermore, the configuration with first and second conductor spirals that are conductively separated, but capacitively coupled by the capacitive coupling pads, provides the desired wireless power transfer without the need for any conductive vias in the enrollment assistance device, while allowing multi-layer configurations. The capacitive coupling between the capacitive coupling pads can thus be said to functionally replace conductive vias.

This in turn provides for the production of enrollment assistance devices that are relatively inexpensive and environmentally friendly, since there is no need for a battery or conventional cabling etc., and since there is no need for conductive connections between layers.

In embodiments, the enrollment assistance device according to the present invention can be made with the first conductor spiral in a first conductor layer on a first side of a first carrier and the second conductor spiral in a second conductor layer on a second side of the first carrier, opposite the first side. For example, the first conductor spiral may be printed on the first side of the first carrier, and the second conductor spiral may be printed on the second side of the carrier. Alternatively, the first conductor spiral may be formed on the first carrier, the second conductor spiral may be formed on a second carrier, and the first and second carriers, with conductor spirals, may be laminated together so that the first conductor layer (with the first conductor spiral) and the second conductor layer (with the second conductor spiral) are separated by the insulating first carrier. The latter configuration may be advantageous from a production perspective, since sheet lamination is an established technique in high volume production.

The enrollment assistance device according to embodiments of the present invention can be distributed to users together with, or separately from, a contactless smartcard with a biometric arrangement.

In embodiments, the enrollment assistance device may be provided in the form of a sheet having the first and second conductor spirals provided on, or embedded in, the sheet. The sheet may at least partly be made of paper, and may be a laminated multi-layer sheet.

The enrollment assistance device may, furthermore, be included in a biometric system, further comprising a contactless smartcard including a biometric arrangement and a wireless power transfer arrangement, wherein the contactless smartcard is arranged on the second surface portion of the enrollment assistance device.

According to a second aspect of the present invention, there is provided a method of enrolling a user having the above-mentioned biometric system, and a user device including a wireless power transfer arrangement arranged to provide an electric field for power transfer adjacent to a backside of the user device, and a display arranged on a frontside of the user device, the method comprising the steps of: instructing the user to arrange the user device on the first surface portion of the enrollment assistance device comprised in the biometric system, with the backside of the user device facing the first surface portion; transmitting, by the user device to the contactless smartcard arranged on the second surface portion, a signal encoding an instruction to the contactless smartcard to start to perform biometric enrollment; and receiving, by the user device from the contactless smartcard arranged on the second surface portion of the enrollment assistance device, after the biometric enrollment has been completed, a signal indicative of completion of the biometric enrollment.

In embodiments, the method may further comprise the steps of performing a user authentication using the user device; and allowing completion of the biometric enrollment only if the user authentication is successful.

The user authentication using the user device may, for example, involve inputting a password, a PIN, or an OTP to the user device, or performing biometric authentication using the user device. Following a successful authentication, the biometric enrollment functionality of the contactless smartcard may be unlocked by a signal provided by the user device to the contactless smartcard. Such a procedure is, per se, well-known to the person skilled in the relevant art.

Alternatively, enrollment in the contactless smartcard may be performed before the above-mentioned user authentication is carried out, and the contactless smartcard may be locked or the enrolled biometric information may be erased if the subsequent user authentication fails or is not performed.

The method according to embodiments of the present invention may advantageously, at least partly, be carried out by a computer program (such as an app) that is run on the user device. Such a computer program may, for example, be provided to the user by the party issuing the contactless smartcard. The contactless smartcard may, for example, be a dual interface smartcard.

In summary, the present invention thus relates to an enrollment assistance device with a first surface portion for a user device, and a second surface portion for a contactless smartcard; a first conductor spiral arranged in the first surface portion; a second conductor spiral conductively separated from the first conductor spiral and arranged in the second surface portion. The first conductor spiral and the second conductor spiral are coupled to each other by capacitive coupling pads.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

Figure 1A:
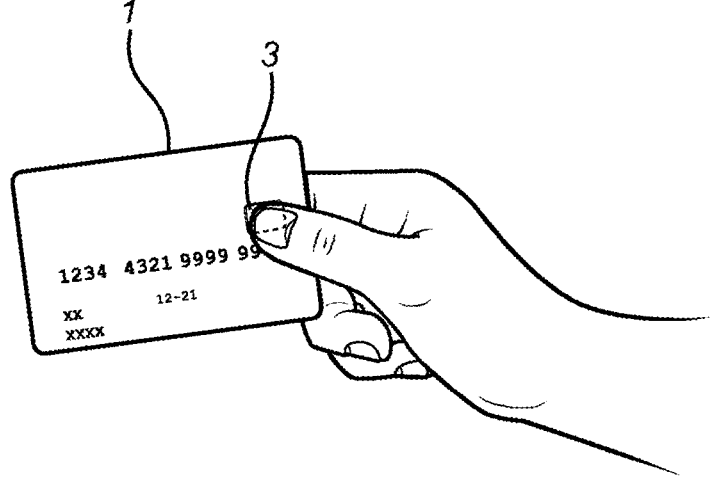
FIG. 1A is an illustration of an exemplary biometrically enabled contactless smartcard.

FIG. 1A schematically illustrates an exemplary contactless smartcard 1 including a biometric arrangement 3, here in the form of a fingerprint sensor module. The contactless smartcard 1 may, for example, be a biometrically enabled payment card, and payments may be authorized by biometrically authenticating the user, as is schematically indicated in FIG. 1A. Of course, a payment card such as that shown in FIG. 1A is not the only kind of biometrically enabled contactless smartcard for which embodiments of the present invention may be useful. Examples of other kinds of biometrically enabled contactless smartcards may include access cards, storage cards, identity cards, etc.

Figure 1B:
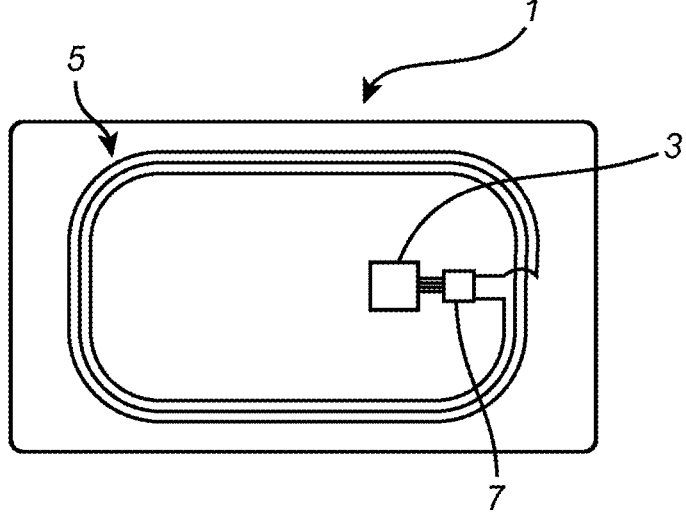
FIG. 1B is a schematic view of the smartcard in FIG. 1A, when delaminated to reveal functional parts of the smartcard.

As is schematically shown in FIG. 1B, the smartcard 1 additionally comprises a wireless power transfer arrangement 5, and, in this particular embodiment, a secure element 7. The wireless power transfer arrangement 5 may be used for harvesting electrical power from a time-varying electrical field, and for wirelessly communicating with a remote device, such as a card reader (not shown), typically through load modulation. The secure element 7 may, for example, contain information for authorizing a transaction, and is connected to the biometric arrangement 3. When the user is authenticated by the biometric arrangement 3 (or by the biometric arrangement 3 in co-operation with the secure element 7), the information contained in the secure element 7 may be unlocked and allowed to be wirelessly communicated to the remote device via the wireless power transfer arrangement 5.

Figure 2:
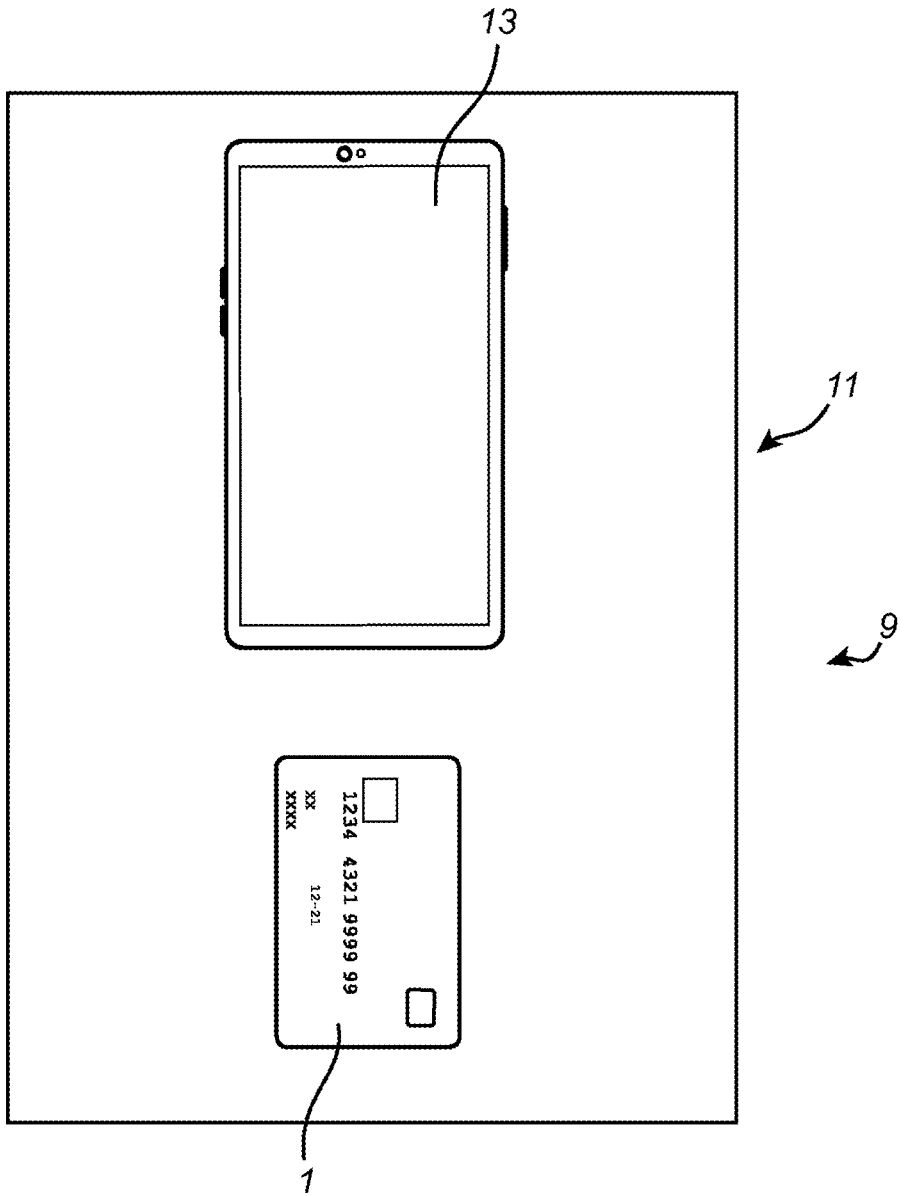
FIG. 2 is a schematic illustration of a biometric system, including an enrollment assistance device according to an example embodiment of the present invention, with a user device and the contactless smartcard in FIG. 1A arranged thereon.

FIG. 2 is a schematic illustration of a biometric system 9, including an enrollment assistance device 11 according to an example embodiment of the present invention, and the contactless smartcard 1 in FIG. 1A arranged on, such as fixed on, a predefined second surface portion of the enrollment assistance device 11. In appearance, the biometric system 9 in FIG. 2 may be similar to the letter sent by an issuer of a smartcard to a user, but the enrollment assistance device 11 taking the place of an ordinary sheet of paper in such a letter can assist the user to effortlessly perform a biometric enrollment using the biometric arrangement 3 of the contactless smartcard 1. The contactless smartcard 1 may, for example, be fixed by a suitable adhesive, may be inserted in a sleeve comprised in the enrollment assistance device 11, or may be loosely arranged on the predefined second surface portion. In FIG. 2, a user device 13 is indicated as being placed on a first surface portion of the enrollment assistance device 11, for wirelessly powering the contactless smartcard 11 during the above-mentioned biometric enrollment.

Figures 3A, 3B:
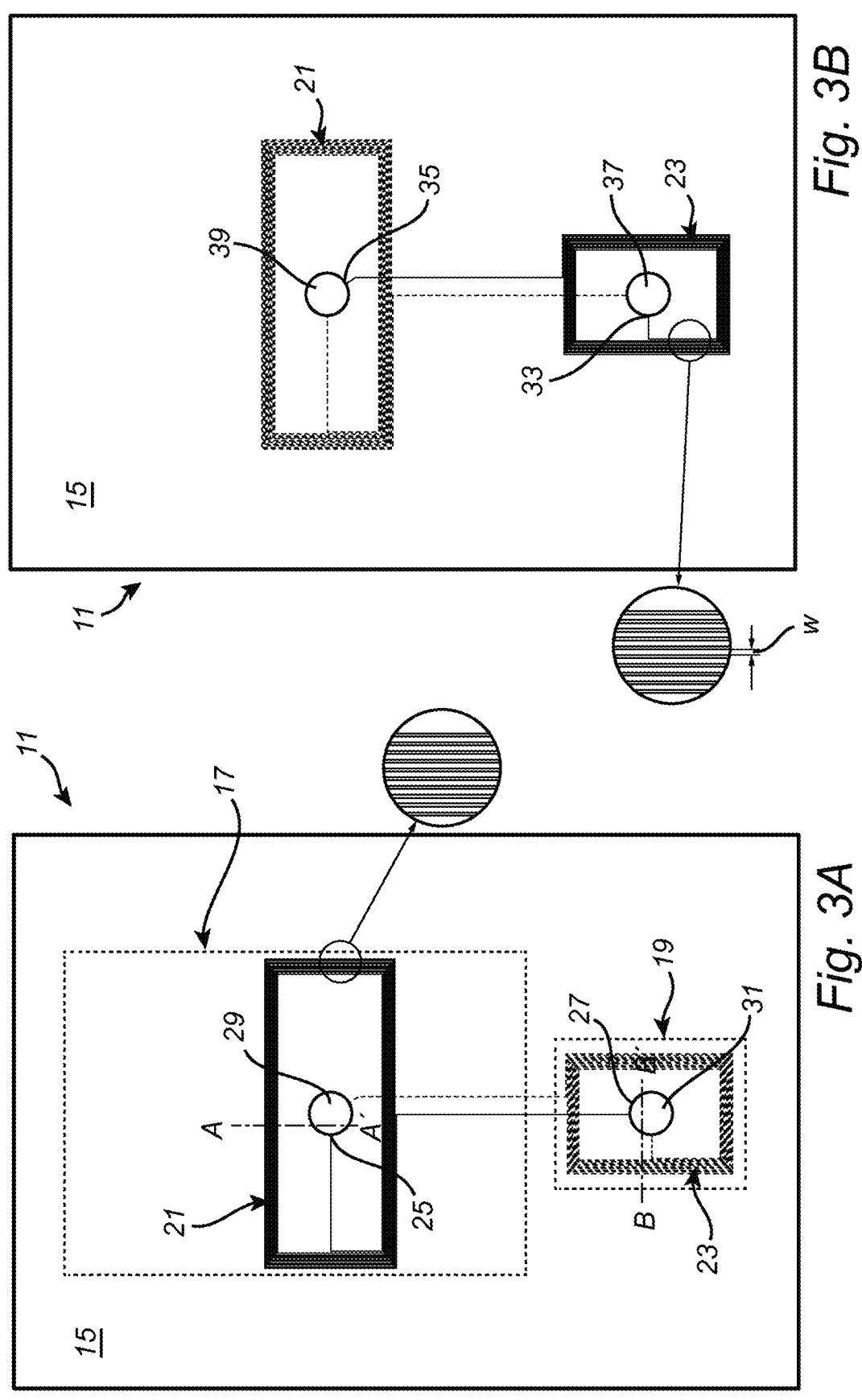
FIG. 3A is a frontside view of the enrollment assistance device in FIG. 2, without the user device and the contactless smartcard.
FIG. 3B is a backside view of the enrollment assistance device in FIG. 2.

FIG. 3A is a frontside view, and FIG. 3B is a backside view of the enrollment assistance device 11 in FIG. 2. Referring first to FIG. 3A, the enrollment assistance device 11 comprises at least a first carrier 15, and has a first surface portion 17 and a second surface portion 19 spaced apart from the first surface portion 17. The first surface portion 17 is for arrangement of a user device 13, and the second surface portion 19 is for arrangement of a contactless smartcard 1. With continued reference to FIG. 3A and FIG. 3B, the enrollment assistance device 11 further comprises an electrically conductive first conductor spiral 21 in a first conductor layer, here on the frontside of the enrollment assistance device 11 (indicated by a solid line in FIG. 3A and by a dashed line in FIG. 3B), and an electrically conductive second conductor spiral 23 in a second conductor layer, here on the backside of the enrollment assistance device 11 (indicated by a dashed line in FIG. 3A and by a solid line in FIG. 3B). Although the first conductor spiral 21 and the second conductor spiral 23 are schematically indicated in FIGS. 3A-B as being generally rectangular, it should be noted that this need not be the case, and that one or both of the first 21 and second 23 conductor spirals may have a different outline, such as circular or elliptical, etc. The at least first carrier 15 may advantageously be cellulose-based, for minimum environmental impact, but could alternatively be made of a plastic material, which may be recycled and/or manufactured without the use of fossil material. The enrollment assistance device 11 may comprise additional carriers. The second conductor spiral 23 may be formed on a second carrier, which may be laminated with the first carrier 15.

The first conductor spiral 21 is arranged to form a first wireless power transfer link with a wireless power transfer arrangement (not shown) of the user device 13, when the user device 13 is arranged on the first surface portion 17. As is schematically shown in FIG. 3A, the first conductor spiral 21 has a first conductor end 25 inside, in other words circumscribed by, the first conductor spiral 21 and a second conductor end 27 outside, in other words not circumscribed by, the first conductor spiral 21. The first conductor end 25 is conductively connected to a first capacitive coupling pad 29 of the first conductor spiral 21, and the second conductor end 27 is conductively connected to a second capacitive coupling pad 31 of the first conductor spiral 21.

The second conductor spiral 23 is arranged to form a second wireless power transfer link with the wireless power transfer arrangement 5 (in FIG. 1B) of the contactless smartcard 1, when the contactless smartcard 1 is arranged on the second surface portion 19. As is schematically shown in FIG. 3B, the second conductor spiral 23 has a first conductor end 33 inside, in other words circumscribed by, the second conductor spiral 23 and a second conductor end 35 outside, in other words not circumscribed by, the second conductor spiral 23. The first conductor end 33 is conductively connected to a first capacitive coupling pad 37 of the second conductor spiral 23, and the second conductor end 35 is conductively connected to a second capacitive coupling pad 39. The second conductor spiral 23 is optimized for power transfer with the wireless power transfer arrangement 5 in the contactless smartcard 1.

In FIGS. 3A-B, the capacitive coupling pads are indicated as being disc-shaped. As will be immediately apparent to one of ordinary skill in the relevant art, the particular shape of the coupling pads is not critical, but many different shapes could be used. Each pair of (at least partly) overlapping capacitive coupling pads forms a parallel plate capacitor, which can easily be dimensioned and adapted to, for example, different materials and thicknesses of the insulating layer between the first and second conductor layers.

Referring to the enlarged portions of FIG. 3A and FIG. 3B, the number of turns in the first conductor spiral 21 and the second conductor spiral may advantageously be 5 to 15, and the spacing w between adjacent conductors may be in the range 0.05 mm to 0.5 mm.

Figure 4A:
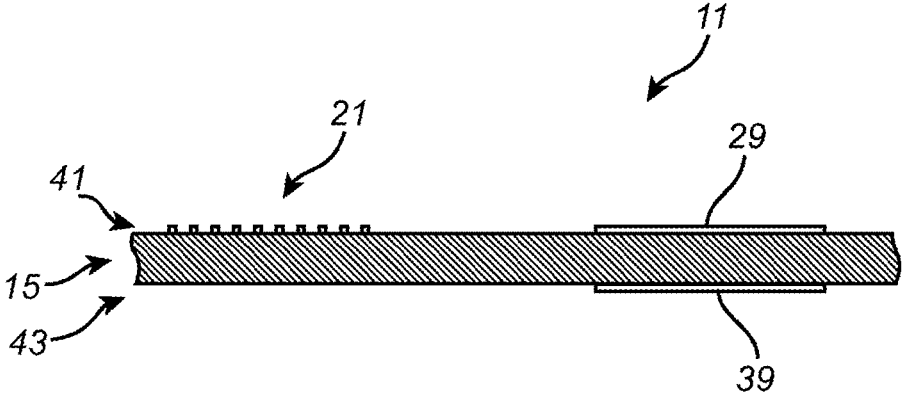
FIGS. 4A-B are schematic cross-section views of the enrollment assistance device at the indicated locations in FIG. 3A.
Figure 4B:
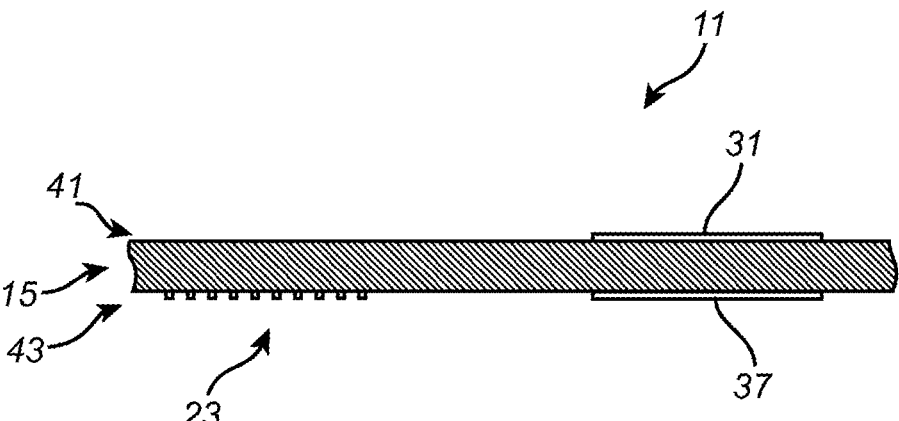

FIG. 4A schematically illustrates a cross-section taken along the line A-A' of an exemplary configuration of the enrollment assistance device 11 in FIG. 3A, and FIG. 4B schematically illustrates a cross-section taken along the line B-B' of an exemplary configuration of the enrollment assistance device 11 in FIG. 3A. In FIG. 4A and FIG. 4B, it can be seen that the first conductor layer 41, including the first conductor spiral 21 and the first 29 and second 31 capacitive coupling pads of the first conductor spiral 21 is separated from the second conductor layer 43, including the second conductor spiral 23 and the first 37 and second 39 capacitive coupling pads of the second conductor spiral 23 by an insulating layer in form of the first carrier 15. Alternatively, as was mentioned above, the enrollment assistance device 11 may advantageously be provided as a laminated structure, where the first conductor layer 41 is formed on the first carrier 15 and the second conductor layer 43 is formed on a second carrier.

As is perhaps best seen in FIGS. 4A-B, the first capacitive coupling pad 29 of the first conductor spiral 21 overlaps with the second capacitive coupling pad 39 of the second conductor spiral 23, and the second capacitive coupling pad 31 of the first conductor spiral 21 overlaps with the first capacitive coupling pad 37 of the second conductor spiral 23.

Hereby, for the frequency range used for NFC, the antenna formed by the first conductor spiral 21 is connected to the antenna formed by the second conductor spiral 23 without the need for relatively costly and complicated via interconnects.

It should be noted that the first 41 and second 43 conductor layers need not be on opposite sides of the first carrier 15 as in FIGS. 4A-B, but may be on the same side of the first carrier 15, and separated by another insulating layer. The first conductor spiral 21 and the second conductor spiral 23 may be printed using conductive ink or paste using per se known techniques. Alternatively, at least one of the first conductor spiral 21 and the second conductor spiral 23 may be pre-formed on a sticker, which may be attached to the first carrier 15. Although not shown in FIGS. 4A-B for simplicity, the conductor spirals may be covered by dielectric layers, such as thin plastic layers. Furthermore, although the first conductor spiral 21 is indicated as being on the frontside of the enrollment assistance device 11 and the second conductor spiral 23 is indicated as being on the backside, it should be noted that this may be reversed, so that the first conductor spiral 21 is on the backside and the second conductor spiral 23 is on the frontside.

It may be challenging to achieve correct arrangement of the user device 13 in relation to the first conductor spiral 21, since different user devices 13 may have wireless power transfer arrangements with different configurations (size and/or shape) and arrangement in the user device 13. To accommodate as many different user devices 13 as possible with minimum effort to the user, the first conductor spiral 21 may be dimensioned to simplify optimal arrangement of the user device 13. In the illustrative example in FIGS. 3A-B, the first conductor spiral 21 is wider than the user device 13 (compare FIG. 2 and FIGS. 3A-B) to allow the user to find the optimal arrangement by movement in the longitudinal direction of the enrollment assistance device 11. Alternatively, the conductor spiral 21 may be taller than the user device 13 to allow optimization by movement perpendicular to the longitudinal direction. Accordingly, the first conductor spiral 21 may advantageously have one dimension that is smaller than the corresponding dimension of the user device (all applicable user devices) and one dimension that is greater than the corresponding dimension of the user device (all applicable user devices).

Alternatively, or in combination, to facilitate correct placement of the user device 13, the enrollment assistance device 11 may therefore be provided with at least one indicium for guiding the user to correctly arrange the user device 13 on the first portion 17, in relation to the first conductor spiral 21. The at least one indicium may, for instance, comprise a number of outlines corresponding to the physical outlines of the most common user devices 13.

Figure 5:
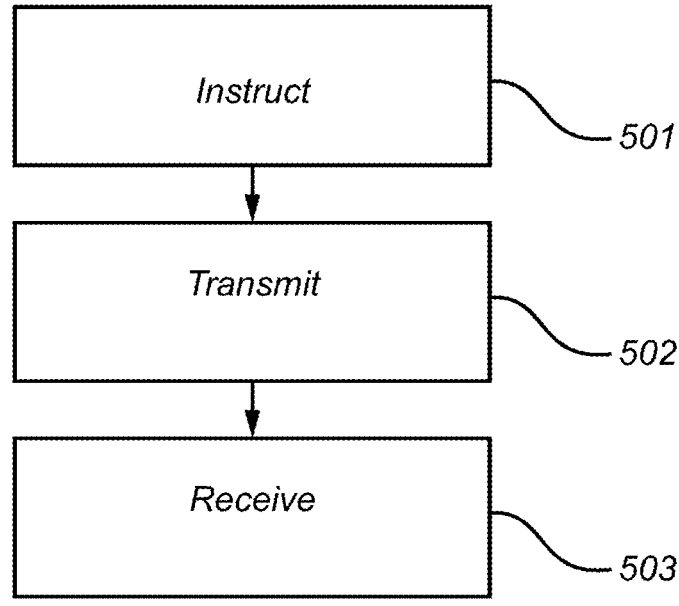
FIG. 5 is a flow-chart illustrating a method according to an example embodiment of the present invention.

A method according to an embodiment of the present invention will now be described with reference to the flow-chart in FIG. 5, and with additional reference to other figures as indicated. When the method is carried out, the user has a biometric system 9 such as that described above with reference to FIG. 2. The biometric system 9, including the enrollment assistance device 11 and the contactless smartcard 1 arranged on the second surface portion 19 may have been sent to the user by mail from the issuer of the card, such as a financial institution or the like. The user is also in possession of a user device 13, such as a mobile phone or tablet, including a wireless power transfer arrangement arranged to provide an electric field for power transfer adjacent to a backside of the mobile user device, and a display arranged on a frontside of the user device 13.

In a first step 501, the user is instructed to arrange the user device 13 on the first surface portion 17 of the enrollment assistance device 11 comprised in the biometric system 9, with the backside of the user device 13 facing the first surface portion 17. The instructing step may include providing guidance to the user. Such guidance may, for example, be included in the biometric system 9 that is provided to the user. For instance, written and/or graphical guidance may be printed on the enrollment assistance device 11. As was mentioned above, such graphical guidance may include outlines of popular mobile phones, etc.

Alternatively, the user may be guided by controlling the user device 13 to provide an alignment pattern on the display of the user device 13. The alignment pattern on the display may be aligned with the at least one indicium on the enrollment assistance device 11.

In the subsequent step 502, the user device 13 transmits, to the contactless smartcard 1 a signal encoding an instruction to the contactless smartcard 1 to start to perform biometric enrollment. The signal is transmitted wirelessly to the contactless smartcard 1, and may be transmitted, using per se known techniques for near field communication (NFC), via the first conductor spiral 21, capacitive coupling between the overlapping capacitive coupling pads (see FIGS. 4A-B), and the second conductor spiral 23 comprised in the enrollment assistance device 11. Alternatively, this signal may be wirelessly transmitted using another wireless communication link, such as using low-power radio transmission.

During the enrollment procedure, the user may be guided by instructions and/or illustrations provided on the display of the user device 13. Such instructions and/or illustrations may be based on information provided wirelessly from the contactless smartcard 1 to the mobile user device 13. For instance, the user may be instructed in respect of finger placement and/or receive information about the status of the enrollment procedure.

When the enrollment procedure has been completed, as determined by the biometric arrangement 3 of the contactless smartcard 1, the user device 13 receives, in step 503, a signal indicating that the enrollment has been completed. The signal indicating that the enrollment has been completed may be received via the second conductor spiral 23, capacitive coupling between the overlapping capacitive coupling pads (see FIGS. 4A-B), and the first conductor spiral 21 comprised in the enrollment assistance device 11 included in the biometric system 9.

In embodiments, the ability to successfully finalize the enrollment and enable use of the biometric capabilities of the contactless smartcard 1 may be conditional on a user authentication performed using the user device 13. This may particularly be the case for a so-called initial enrollment, where no biometric template is stored on the smartcard. In such embodiments, the user device 13 may locally carry out the user authentication, for example using a fingerprint sensor or other biometric arrangement comprised in the user device 13. Alternatively, the user device 13 may be used as an input device for input of a code, such as a password, PIN or OTP, for transmission to a remote server for authentication there.

In embodiments, the signal encoding a (correct) instruction to the contactless smartcard 1 to start to perform the enrollment may only be sent if a successful user authentication has first been performed. In other embodiments, the enrollment may be carried out, but the generated biometric template may be discarded, or the biometric capabilities of the smartcard 1 may be locked unless a successful user authentication is performed.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An enrollment assistance device, for facilitating biometric enrollment of a user of a contactless smartcard including a biometric arrangement and a wireless power transfer arrangement, the enrollment assistance device comprising:

a first conductor spiral in a first conductor layer of the enrollment assistance device, and arranged to form a first wireless power transfer link with the wireless power transfer arrangement of a user device when the user device is arranged on a first surface portion of the enrollment assistance device, the first conductor spiral having a first conductor end inside the first conductor spiral and a second conductor end outside the first conductor spiral, wherein the first conductor end is conductively connected to a first capacitive coupling pad of the first conductor spiral and the second conductor end is conductively connected to a second capacitive coupling pad of the first conductor spiral; and a second conductor spiral in a second conductor layer of the enrollment assistance device conductively separated from the first conductor layer by an insulating layer, and arranged to form a second wireless power transfer link with the wireless power transfer arrangement of the contactless smartcard when the contactless smartcard is arranged on a second surface portion of the enrollment assistance device, the second conductor spiral having a first conductor end inside the second conductor spiral and a second conductor end outside the second conductor spiral, wherein the first conductor end is conductively connected to a first capacitive coupling pad of the second conductor spiral and the second conductor end is conductively connected to a second capacitive coupling pad of the second conductor spiral, wherein the first capacitive coupling pad of the first conductor spiral overlaps with the second capacitive coupling pad of the second conductor spiral, and the second capacitive coupling pad of the first conductor spiral overlaps with the first capacitive coupling pad of the second conductor spiral.

2. The enrollment assistance device according to claim 1, wherein:

the enrollment assistance device comprises at least a first carrier; and the first conductor layer is on a first side of the first carrier, and the second conductor layer is on a second side of the first carrier, opposite the first side.

3. The enrollment assistance device according to claim 2, wherein the first conductor spiral is printed on the first carrier.

4. The enrollment assistance device according to claim 2, wherein:

the enrollment assistance device comprises a second carrier;

the second conductor layer is on a first side of the second carrier; and the first carrier with the first conductor layer and the second carrier with the second conductor layer are laminated together.

5. The enrollment assistance device according to claim 4, wherein the second conductor spiral is printed on the second carrier.

6. The enrollment assistance device according to claim 1, wherein the enrollment assistance device comprises at least one indicium for guiding the user to correctly arrange the user device on the first portion of the enrollment assistance device, in relation to the first conductor spiral.

7. The enrollment assistance device according to claim 1, wherein the at least first carrier is provided in the form of a sheet.

8. The enrollment assistance device according to claim 1, wherein the at least first carrier is cellulose-based.

9. A biometric system comprising:

an enrollment assistance device, for facilitating biometric enrollment of a user of a contactless smartcard including a biometric arrangement and a wireless power transfer arrangement, the enrollment assistance device comprising:

a first conductor spiral in a first conductor layer of the enrollment assistance device, and arranged to form a first wireless power transfer link with the wireless power transfer arrangement of a user device when the user device is arranged on a first surface portion of the enrollment assistance device, the first conductor spiral having a first conductor end inside the first conductor spiral and a second conductor end outside the first conductor spiral, wherein the first conductor end is conductively connected to a first capacitive coupling pad of the first conductor spiral and the second conductor end is conductively connected to a second capacitive coupling pad of the first conductor spiral; and a second conductor spiral in a second conductor layer of the enrollment assistance device conductively separated from the first conductor layer by an insulating layer, and arranged to form a second wireless power transfer link with the wireless power transfer arrangement of the contactless smartcard when the contactless smartcard is arranged on a second surface portion of the enrollment assistance device, the second conductor spiral having a first conductor end inside the second conductor spiral and a second conductor end outside the second conductor spiral, wherein the first conductor end is conductively connected to a first capacitive coupling pad of the second conductor spiral and the second conductor end is conductively connected to a second capacitive coupling pad of the second conductor spiral, wherein the first capacitive coupling pad of the first conductor spiral overlaps with the second capacitive coupling pad of the second conductor spiral, and the second capacitive coupling pad of the first conductor spiral overlaps with the first capacitive coupling pad of the second conductor spiral; and a contactless smartcard including a biometric arrangement and a wireless power transfer arrangement, wherein the contactless smartcard is arranged on the second surface portion of the enrollment assistance device.

10. A method of enrolling a user having the biometric system according to claim 9, and a user device including a wireless power transfer arrangement arranged to provide an electric field for power transfer adjacent to a backside of the user device, and a display arranged on a frontside of the user device, the method comprising the steps of:

instructing the user to arrange the user device on the first surface portion of the enrollment assistance device comprised in the biometric system, with the backside of the user device facing the first surface portion;

transmitting, by the user device to the contactless smartcard arranged on the second surface portion of the carrier, a signal encoding an instruction to the contactless smartcard to start to perform biometric enrollment; and receiving, by the user device from the contactless smartcard arranged on the second surface portion of the enrollment assistance device, after the biometric enrollment has been completed, a signal indicative of completion of the biometric enrollment.

11. The method according to claim 10, wherein:

the signal encoding the instruction to the contactless smartcard to perform biometric enrollment is transmitted via the first conductor spiral, capacitive coupling between the overlapping capacitive coupling pads, and the second conductor spiral comprised in the enrollment assistance device included in the biometric system; and the signal indicating that the enrollment has been completed is received via the second conductor spiral, capacitive coupling between the overlapping capacitive coupling pads, and the first conductor spiral comprised in the enrollment assistance device included in the biometric system.

12. The method according to claim 10, further comprising the steps of:

performing a user authentication using the user device; and allowing completion of the biometric enrollment only if the user authentication is successful.

13. A computer program product comprising program code for configured to, when executed by processing circuitry comprised in a user device including a wireless power transfer arrangement on a backside of the user device and a display on a frontside of the user device, control the user device to carry out the steps of the method according to claim 10.

* * * * *